April 4, 1967 F. W. KUECKER 3,312,299
BICYCLE PROPELLING UNIT
Filed June 10, 1965 2 Sheets-Sheet 1
FIG. 1
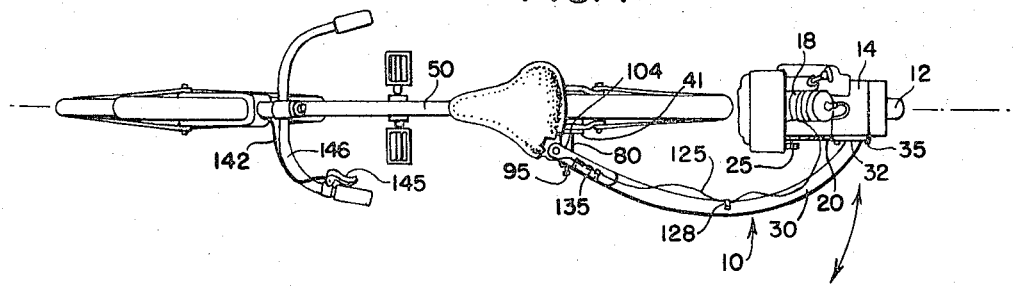
FIG. 3
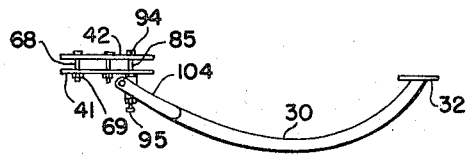
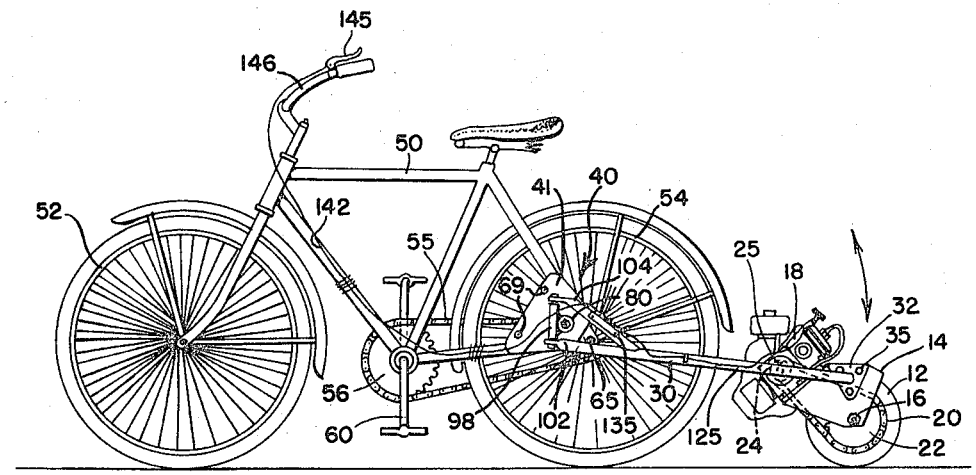
FIG. 2
INVENTOR.
FLOYD W. KUECKER
BY
Schroeder, Siegfried & Ryan
ATTORNEYS April 4, 1967
F. W. KUECKER
3,312,299
BICYCLE PROPELLING UNIT
Filed June 10, 1965
2 Sheets-Sheet 2
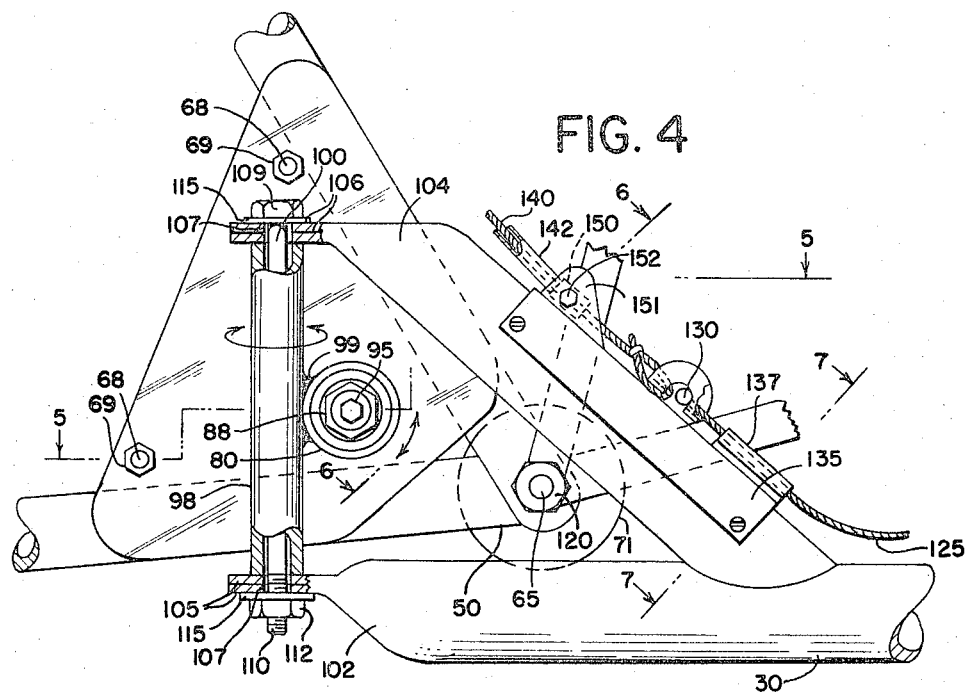
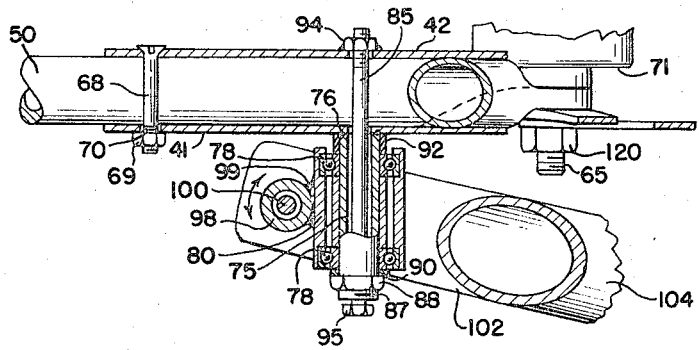
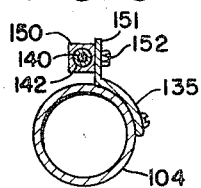
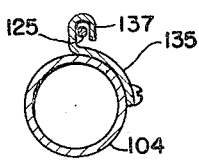
INVENTOR.
FLOYD W. KUECKER
BY
Schroeder, Siegfried & Ryan
ATTORNEYS

United States Patent Office 3,312,299
Patented Apr. 4, 1967

3,312,299
BICYCLE PROPELLING UNIT
Floyd W. Kuecker, 1620 S. 29th St.,
La Crosse, Wis. 54601
Filed June 10, 1965, Ser. No. 462,901
7 Claims. (Cl. 180—11)

My invention relates to power driven bicycles and more particularly to an improved power drive unit for bicycles which may be readily attached and detached therefrom.

Power units for bicycles and bicycles with built-in drive engines are known and in use. The built-in power unit added to a bicycle on the frame and driving through the bicycle drive wheel has been found to be impractical because of the difficulty in mounting a power unit thereon and connecting it to the drive wheel of the bicycle and because of the instability problems resulting therefrom. Further, such structures require mechanical changes in the bicycle frame to facilitate such a mounting which changes tend to weaken the structure of the bicycle frame. The add-on power units for bicycles in which the power unit has a separate drive wheel has heretofore been found to be impractical because of the difficulty in mounting or connecting the power unit to the bicycle, the instability problems in the operation of the resultant unit, and the fact that such units have previously not been readily attached or detachable.

The present invention is directed to a simplified power unit for bicycles which may be readily attached to or detached from the same and when attached does not alter the stability of the bicycle while providing a positive drive. Further, the improved power unit is located in a tandem relationship trailing the drive wheel of the bicycle in an out of way location which does not require straddling and its center of gravity is located such that the normal stand for the bicycle will support the same in a rest position. In addition, the location of the power unit and its connection to the bicycle frames does not affect the balance or control of the bicycle.

It is therefore the principal object of this invention to provide an improved power unit for bicycles.

Another object of this invention is to provide a power unit for bicycles with a simplified mounting which permits ready attachment and detachment from the frame of the bicycle.

Another object of this invention is to provide a power unit for bicycles which does not require an alteration of the frame of the bicycle to attach the power unit.

A still further object of this invention is to provide a power unit for bicycles which is connected to the bicycle frame through a pivotal connection having a horizontal and vertical displacement axes to permit the power unit to trail the bicycle frame under all conditions and provide a positive driving force aligned with the longitudinal axes of the bicycle.

A still further object of this invention is to provide a power unit for bicycles in which the power unit has a center of gravity located below the axle of the bicycle wheel to increase stability and efficient driving operation.

A still further object of this invention is to provide a power unit for bicycles which is simple in design, readily installed and easy to maintain.

These and other objects of this invention will become apparent from a reading of the attached description together with the drawings wherein:

FIGURE 1 is a plan view of a bicycle with an improved power unit attached thereto;

FIGURE 2 is a side elevation view of a bicycle with the improved power unit attached thereto;

FIGURE 3 is a plan view of the mounting arm for the improved power unit;

FIGURE 4 is an elevation view of a portion of the mounting frame of the power unit showing its attachment to the bicycle frame;

FIGURE 5 is a sectional view of a portion of the mounting frame taken along the lines 5—5 in FIGURE 4;

FIGURE 6 is a sectional view of the mounting frame of FIGURE 4 taken along the lines 6—6 therein; and FIGURE 7 is a sectional view of the mounting frame of FIGURE 4 taken along the lines 7—7 therein.

My improved power unit for bicycles is shown in plan and side elevation views in FIGURE 1 as applied to a bicycle. The improved power unit is shown generally at 10 as comprising a drive wheel 12 journaled in a mounting frame 14 through a suitable axle 16 and driven by a drive engine 18 which is of the gasoline type. The drive engine is coupled to the drive wheel by means of a chain 20 mounted on a sprocket 22 suitably attached to the drive wheel with a chain connecting on a cooperating sprocket 24 carried by a clutch 25 coupled to the output shaft of the engine. The drive engine is shown herein as a conventional gasoline engine and its cooperating parts are shown only schematically since any equivalent drive structure or motive means may be used for this purpose. The gasoline engine and its drive wheel are carried on the mounting structure 14 which has included therewith a curved mounting arm 30 attached to the mounting frame 14 by means of a plate 32 which is suitably secured to the frame 14 by bolt means, indicated generally at 35.

As will be seen in FIGURES 1 and 2, arm 30 of the mounting frame is curved along its extent and carries a pivot structure indicated generally at 40, its opposite extremity with the pivot structure mounting a pair of spaced plates 41, 42 which attach to the frame 50 of the bicycle. The bicycle is shown only schematically as comprising a steerable front wheel 52 and a rear driver wheel 54 which is mounted at the rear end of the frame of the bicycle. This driver wheel is normally driven by a chain 55 mounted over a sprocket 56 and coupled to a rear sprocket (not shown) with pedals 60 connected to the drive sprocket for conventional operation of the bicycle. As will be best seen in FIGURE 2, the spaced side plates 41, 42 attach to the bicycle frame at the rear extremity thereof adjacent the mounting of the rear or drive wheel 54 of the bicycle ahead of the drive axle 65 which is mounted on the frame. The pivot structure and the mounting are shown in enlarged and sectional views of FIGURES 4 and 5 to disclose this relationship of parts.

The plates 41, 42 are generally triangular in shape with a portion of one corner removed to facilitate mounting of the same in close proximity with the hub of the rear bicycle wheel. The plates are held together in a clamping relationship by means of bolts 68 and nuts 69, the bolts extending through apertures in the plates such as is indicated at 70, with the nuts being threaded on the bolts to clamp the plates together. As will be seen in FIGURES 4 and 5, the plates fit around the tubular frame structure 50 of the bicycle at the rear end thereof where the rear supporting fork comes together at a suitable notch or aperture to mount the hub 71 and axle of the wheel. The pivot structure 40 is comprised of two pivot members which permit displacement about a horizontal and vertical axes. As will be seen in FIGURE 5, the plate 41 has a cylindrical member 75 connected thereto through suitable means such as welding 76 and mounts a pair of ball bearings 78 which support an outer cylindrical member 80 thereon concentric with the inner cylindrical member 75 to define the first pivot axes of the pivot structure. A bolt 85 extends through the inner cylindrical member which is threaded at its free extremity, as at 87, to mount a nut 88 thereon and clamp a supporting washer 90 against the inner bearing race for the purpose of mounting the same between a shoulder 92 on the inner cylindrical member and the washer. This will secure the outer cylindrical member on the outer bearing race and mount the same in journaled relationship on the inner cylindrical member. In addition, the bolt 85 extending through the inner cylindrical member threads into a nut 94 welded to plate 42 at one extremity and mounts a clamping nut 95 at the other extremity to aid in the clamping of the plates 41, 42 in assembled relationship. The outer cylindrical member 80 is welded or suitably secured to a cylindrical part or member 98 of the pivot structure for the second pivot axis, the welding or securing means being shown at 99. The cylindrical member 98 extends normal to the axes of the cylindrical members 75 and 80 defining the first pivot axes and has a pivot pin or bolt 100 extending through the center of the same which pin mounts the bifurcated extremities 102, 104 of the arm 30 defining the other extremity of the arm. As will be seen in FIGURE 4, these bifurcated extremities have flattened tips 105, 106 with apertures 107 therein through which the pin or bolt 100 extends. Bolt 100 has a tool receiving head 109 at one extremity and is threaded at the other extremity, as at 110, to mount a nut 112. Suitable spacing washers 115 are positioned respectively between the head 109, nut 112 and the flattened tips 105, 106 of the bifurcated ends 102, 104 for the arm 30 to journal the same thereon in a vertical axis normal to the extent of the first named axis of the pivot structure 40.

As will be noted in FIGURES 4 and 5, the displacement axes of the pivot structure which connect the arm 30 mounting the power unit to the frame are placed substantially at the level of the axle 65 of the rear driver wheel of the bicycle or slightly above the same and ahead of the same. Thus in the mounting of the plates on the bicycle frame, the nuts 69 on the bolts 68 are loosened to separate the plates, as is the nut 95 on the bolt 85, so that the plates may fit around the tubular portion of the frame and the plates may be moved back to the rear of the frame as close to the hub 70 as spacing permits without contact of the same. The rear wheel of the bicycle is mounted in the slot or notch in the end of the frame and is maintained secured therein in a conventional manner through the clamping nuts 120 normally mounting the rear wheel. The plates when properly positioned in adjacent relationship to the axle of the rear wheel will be clamped together by threading the nuts 69 and 95 on the respective bolts 68 and 85 to clamp the plates together around the tubular portion of the frame. Thus the thrust from the power unit will be applied through the arm and to the frame as close to the driving wheel as possible with the pivot axes of the power unit being located similarly as close to the rear wheel axis as possible to insure stability of the power unit.

As will be noted from FIGURES 1 and 2, the spaced plates mounted on the pivot structure 40 at one end of the curved arm 60 project translationally from the arm in the normal position a lesser distance than the mounting frame 14 for the drive wheel 12 and engine 18 and position the drive wheel in alignment with and in trailing relationship to the drive and front wheels of the bicycle. Thus the thrust of the power unit will be applied to the frame in such a manner as to eliminate any sway or translational forces against the side of the bicycle. It will also be noted that the frame 14 through the mounting arm 20 and spaced plates is attached to one side of the wheel axle and the arm 30 is curved to position the pivot structure and the extent of the arm clear of the rear end of the bicycle including the drive wheel to permit articulation of the power unit as the bicycle is moved in a curved path. Similarly the power unit and drive wheel have their center of gravity located below the wheel axle of the driver wheel to insure stability of the unit. The horizontal pivot axes provides for trailing and continuous application of thrust on uneven terrain.

Control of the power unit is effected through a conventional throttle cable indicated at 125 which extends from the engine and is clipped on the arm 30 through suitable clips 128. At the bifurcated end of the arm 30, the cable is tied through a conventional coupling member 130 and is mounted thereon through a suitable clamping plate 135 so that the sheave of the cable will be positively supported to permit actuation of the throttle. As shown in FIGURE 7, the clamping plate 135 is bent over as at 137 to position the cable sheath and allow the cable to extend thereto to the coupling member 130. Thereafter an extension of the cable in the form of a second cable 140 and sheath 142 are connected to the end of the first named cable and extend along the bicycle frame to an operating handle 145 normally positioned on the handlebars 146 of the bicycle. The sheath 142 of the second section of the throttle cable is secured on the supporting bracket 135 by means of a block clamp 150 which is mounted on a flange extension 151 of the bracket 135 and secured thereon by a screw 152. It will be recognized that a continuous cable may be utilized for this purpose, if desired, but the splicing and coupling of the cable permits the use of a conventional operating handle and cable from the bicycle frame and connection of the same to the throttle cable mounted on the arm 30.

The improved power unit for the bicycle provides a readily attachable and detachable structure to facilitate mounting of the same on a bicycle and removal of the same whenever it is desired to separate the power unit therefrom. This mounting directs the driving thrust of the drive wheel 12 of the power unit to the bicycle frame at the point where the normal drive thrust is imparted by means of its own drive wheel through the manual operation of the pedals 60 and the drive sprocket 56. Further the power unit is mounted below the center of gravity of the bicycle and out of the way in trailing relationship behind the same so that it does not present any obstacle in the straddling of the bicycle during the operation of the same. Further, the curved arm permits articulation of the pivot structure so that the power unit may trail the bicycle during operation of the same in a curved path or over an uneven terrain. This improved structure when connected can be normally supported by the stand of the bicycle (not shown) and permits normal steering and safe operation of the vehicle.

In considering this invention it should be remembered that the present disclosure is intended to be primarily illustrative and that variation may be made in the shape and connection of parts within the scope of the invention. Therefore I wish to be limited only by the appended claims.

What is claimed is:

1. A power drive unit for bicycles comprising, a frame having a single road wheel journaled on one end thereof and a drive engine mounted on the frame and coupled to the road wheel in driving relation therewith, said frame being comprised of a curved arm extending from the road wheel with a pivot structure having horizontal and vertical displacement axes at the other end of the arm, a pair of spaced parallel plate members mounted on the pivot structure and including connection means therein connecting the plates together in a clamping relationship, said plate members being mounted to fit around the clamp on one end of a frame of a bicycle ahead of and in adjacent relationship with the hub of the rear wheel axle of the bicycle, and control cable means extending from the drive engine and mounted on the arm of the frame with a portion extending beyond said arm and adapted to be mounted on the bicycle frame for control of the drive engine, said pivot structure being located normal to and affixed on one of the spaced plates and positioned on one side of the bicycle frame to extend translationally from one end of said curved arm and with the other end of the curved arm with the drive engine attached thereto being positioned such that the drive wheel of the power unit will be aligned with the rear bicycle wheel.

2. The power drive unit for bicycles of claim 1 in which the frame with the drive engine mounted thereon is so attached to the bicycle frame that it has a center of gravity and its axes of the road wheel are positioned below the rear bicycle wheel axle and in which the pivot structure is substantially at the same level vertically and ahead of the rear bicycle wheel axle.

3. The power drive unit for bicycles of claim 2 in which the pivot structure includes a first pivot member having a part fixed to one of the spaced plates with the axis of the pivot member extending normal to the plates and a second part mounting a part of a second pivot member whose pivot axis is normal to the first named axis with a second part of the second pivot member being connected to the end of the arm of the frame remote from the single road wheel.

4. A power drive bicycle comprising, a bicycle frame having a steerable pivoted front wheel and a fixed driver wheel journaled on the rear of the frame, a power unit for the bicycle having a single road drive wheel journaled on a mounting frame with a drive engine mounted on the mounting frame and coupled to the road drive wheel in driving relation therewith, said mounting frame having a curved arm extending therefrom with a pivot structure having horizontal and vertical displacement axes at an extremity of the curved arm of the mounting frame remote from the road drive wheel, a pair of spaced parallel plate members mounted on the pivot structure and including connection means therein adapted to clamp the plate members together, said plate members being positioned around portions of the bicycle frame ahead of and in adjacent relationship with fixed driver wheel of the bicycle and clamped thereon, and control means including an elongated cable extending from the drive engine and mounted on the arm of the mounting frame and on the bicycle frame for control of the drive engine, said curved arm of the mounting frame extending around and clear of the rear fixed driver wheel of the bicycle to mount said frame in tandem with the bicycle and permit pivoting of the arm on the pivot structure about the horizontal and vertical displacement axes with clearance between the arm and the bicycle frame.

5. The power driven bicycle of claim 4 in which the drive engine is a gasoline engine.

6. The power driven bicycle of claim 5 in which the horizontal and vertical displacement axes of the pivot structure on the arm are positioned to one side of the driver wheel of the bicycle and the road wheel of the power unit and the drive engine are aligned with the rear wheel in trailing relationship.

7. The power driven bicycle of claim 6 in which the spaced plates mount one part of the pivot structure on one of the spaced plates with the remaining portion of the pivot structure being positioned between the end of the arm and the spaced plates, and in which the spaced plates are positioned together through nut and bolt means to be maintained in a parallel relationship such that the spacing therebetween may be readily adjustable to facilitate attachment and detachment from the bicycle frame.

References Cited by the Examiner

UNITED STATES PATENTS

| 1,165,467 | 12/1915 | Tideman | 180—11 |
| 1,373,918 | 4/1921 | Smith | 180—11 |
| 2,552,846 | 5/1951 | Dinkins | 180—11 |

FOREIGN PATENTS

| 869,109 | 1/1942 | France. |
| 874,619 | 4/1942 | France. |

BENJAMIN HERSH, *Primary Examiner.*

C. C. PARSONS, *Assistant Examiner.*